UNITED STATES PATENT OFFICE.

ELNATHAN K. NELSON, OF TAKOMA PARK, MARYLAND.

VANILLYL AMIN, VANILLYL ACYL AMID, AND PRODUCTION THEREOF.

1,329,272.

Specification of Letters Patent.   Patented Jan. 27, 1920.

No Drawing.   Application filed October 9, 1919. Serial No. 329,156.

(FILED UNDER THE ACT OF MARCH 3, 1883, 22 STAT. L., 625.)

*To all whom it may concern:*

Be it known that I, ELNATHAN K. NELSON, a citizen of the United States of America, and an employee of the Department of Agriculture of the said United States, residing in the city of Takoma Park, county of Montgomery, State of Maryland, (whose post-office address is Washington, D. C.,) have invented a new and useful Series of Compounds—Namely, Vanillyl Amin, Vanillyl Acyl Amids, and Production Thereof.

This application is made under the act of March 3, 1883, chapter 143 (22 Stat. L. 625), and the invention herein described and claimed may be used by the Government of the United States, or any of its officers or employees, in the prosecution of work for the Government, and by any person in the United States, without payment to me of any royalty thereon.

Vanillyl acyl amids are more or less pungent substances, related chemically to the pungent principle of Cayenne pepper. Certain of them, such as vanillyl octoyl amid and vanillyl nonoyl amid, are extremely pungent.

The more pungent compounds of the series can be used as substitutes for, or to fortify, Cayenne pepper, for use in beverages, foods, or otherwise, to produce a hot or pungent taste.

These substances, which possess a uniform and definite strength, can be used in medicine in place of capsicum, namely, as counter-irritants, or stimulants, or otherwise, in the manner in which capsicum is used.

The following is a specification of vanillyl amin, vanillyl amids and productions thereof:

(1) Vanillyl amin is prepared as follows: Vanillin, in alcoholic solution, is treated with the necessary amount of hydroxylamin hydrochlorid and sodium carbonate, and after standing in a warm place for 24 hours, the excess of alcohol is evaporated and water added, which throws down vanillin oxim.

Vanillin oxim (7 parts by weight) is dissolved in 20 parts of alcohol and reduced with 160 parts of 2.5% sodium amalgam, 14 parts of glacial acetic acid being gradually added, so as to maintain an acid reaction in the mixture.

The mixture is diluted with water and an excess of hydrochloric acid (sufficient to liberate all of the acetic acid and convert the base into the hydrochlorid) is then added, and the solution evaporated to dryness. The hydrochlorid of the base is dissolved in boiling alcohol and filtered from sodium chlorid. The product crystallizes from the alcohol on cooling.

The free base is isolated by adding to a solution of the hydrochlorid in lukewarm water an amount of 10% sodium hydroxid solution just sufficient to neutralize the hydrochloric acid. On standing, vanillyl amin separates in fine needles.

The melting point of the product, dried at 110° to free it from water of crystallization, is 131–133°.

Vanillyl amin is very unstable, being easily decomposed by caustic alkalis and even by boiling water. In a dry form it will keep for some time if stored in a dry, cool and dark place.

(2) Vanillyl amin is condensed with acids, acid anhydrids or acyl chlorids, thus forming vanillyl acyl amids.

Vanillyl acyl amids are made by the interaction of vanillyl amin and acyl chlorids as follows:

A weight corresponding to two molecules of vanillyl amin (freed from moisture by drying at 110°) is suspended in dry ether and an amount of the acyl chlorid equivalent to one molecule is added while stirring. The mixture is very gently heated to insure completion of the reaction, water and a little hydrochloric acid are added and the mixture is shaken out, the aqueous layer being drawn off and the excess of vanillyl amin hydrochlorid recovered from it.

The ether solution is washed with a dilute solution of sodium carbonate, to remove any uncombined acid, and evaporated, leaving a residue of vanillyl acyl amid which is purified by crystallizing from a suitable solvent, usually benzene for the lower members of the series or petroleum ether containing some ethyl ether for the higher ones.

The acids, acid anhydrids and acyl chlorids used in the production of vanillyl acyl amids include saturated fatty acids such as acetic, propionic, butyric, isobutyric, valeric, isovaleric, caproic, heptoic, caprylic, nonoic, capric, undecoic and lauric acids, and the corresponding acid anhydrids and acyl chlorids; unsaturated acids such as crotonic, decenoic and undecenoic acids, and the corresponding acid anhydrids and acyl chlorids; and aromatic acids such as benzoic and cinnamic, and the corresponding acid anhydrids and acyl chlorids.

Having thus described my invention, I claim:

1. The new derivative of vanillin described as vanillyl amin, which is a crystalline base melting at 131–133° C.

2. The process of producing vanillyl acyl amid, which consists in obtaining an interaction of vanillyl amin with organic acids.

In testimony whereof, I affix my signature in the presence of two subscribing witnesses.

ELNATHAN K. NELSON.

Witnesses:
FREDERICK B. POWER,
T. K. CHESNUT.